(12) United States Patent
Myllymäki et al.

(10) Patent No.: US 7,228,136 B2
(45) Date of Patent: Jun. 5, 2007

(54) LOCATION ESTIMATION IN WIRELESS TELECOMMUNICATION NETWORKS

(75) Inventors: Petri Myllymäki, Helsinki (FI); Henry Tirri, Helsinki (FI); Petri Kontkanen, Helsinki (FI); Jussi Lahtinen, Helsinki (FI); Tomi Silander, Lahti (FI); Teemu Roos, Helsinki (FI); Antti Tuominen, Espoo (FI); Kimmo Valtonen, Helsinki (FI); Hannes Wettig, Kulloonkylä (FI)

(73) Assignee: Ekahau Oy, Helsinki (FI)

( * ) Notice: Subject to any disclaimer, the term of this patent is extended or adjusted under 35 U.S.C. 154(b) by 847 days.

(21) Appl. No.: 10/465,785

(22) Filed: Jun. 20, 2003

(65) Prior Publication Data

US 2004/0072577 A1 Apr. 15, 2004

Related U.S. Application Data

(63) Continuation of application No. PCT/FI01/01151, filed on Dec. 27, 2001.

(30) Foreign Application Priority Data

Dec. 29, 2000 (FI) .................................. 20002891

(51) Int. Cl.
$H04Q\ 7/20$ (2006.01)
(52) U.S. Cl. ............... 455/456.1; 455/426; 342/357.02
(58) Field of Classification Search ............. 455/456.1, 455/436, 440, 524, 450, 426; 342/357.01, 342/357.02, 357.03
See application file for complete search history.

(56) References Cited

U.S. PATENT DOCUMENTS 5,481,588 A 1/1996 Rickli et al.
6,112,095 A 8/2000 Wax et al.
6,263,208 B1 7/2001 Chang et al.
6,266,014 B1 7/2001 Fattouche et al.

(Continued)

FOREIGN PATENT DOCUMENTS

| EP | 1 045 602 A2 | 10/2000 |
|----|--------------|---------|
| JP | 10-094040 | 4/1998 |
| WO | WO 98/10307 | 3/1998 |
| WO | WO 00/69198 | 11/2000 |

OTHER PUBLICATIONS

Bahl, Paramvir et al., "User Location and Tracking in an In-Building Radio Network," Technical Report MSR-TR-99-12, Microsoft Research (Redmond, WA), p. 1-12, (Feb. 1999).

(Continued)

*Primary Examiner*—Creighton Smith
(74) *Attorney, Agent, or Firm*—Barnes & Thornburg LLP

(57) ABSTRACT

A method for estimating a receiver's location in a wireless communication environment having several channels. Each channel has at least one signal parameter that varies with location differently from the other channels. A set of calibration data is determined for each calibration point, each set including the location and at least one measured signal parameter for each of several channels. The calibration data serve as a basis for a statistical model of the signal parameters versus a receiver's location. A set of observed signal parameters is determined, the set including at least one signal parameter for each of several channels at the receiver's location. A location estimate approximating the location of the receiver is determined on the basis of the statistical model and the set of observed signal parameters.

15 Claims, 2 Drawing Sheets

U.S. PATENT DOCUMENTS

| | | | |
|---|---|---|---|
| 6,269,246 | B1 | 7/2001 | Rao et al. |
| 6,393,294 | B1 | 5/2002 | Perez-Breva et al. |
| 6,571,082 | B1* | 5/2003 | Rahman et al. .......... 455/67.11 |
| 6,782,265 | B2 | 8/2004 | Perez-Breva et al. |
| 6,889,053 | B1* | 5/2005 | Chang et al. ............ 455/456.3 |
| 2001/0022558 | A1* | 9/2001 | Karr et al. .................. 342/450 |
| 2004/0072577 | A1* | 4/2004 | Myllymaki et al. ...... 455/456.1 |
| 2005/0136944 | A1* | 6/2005 | Misikangas et al. ..... 455/456.1 |
| 2005/0197139 | A1* | 9/2005 | Misikangas et al. ..... 455/456.1 |

OTHER PUBLICATIONS

Geiger et al., "Parameter Priors for Directed Acyclic Graphical Models and the Characterization of Several Probability Distributions," Technical Report MSR-TR-98-67, Microsoft Corporation (Redmond, WA 98052), 31 pp.

Heckerman, "A Tutorial on Learning Bayesian Networks," Technical Report MSR-TR-95-06, Microsoft Corporation (Redmond, WA), 40 pp.

Kontkanen et al., "On predictive distributions and Bayesian networks," Statistics and Computing, Kluwer Academic Publishers, No. 10, pp. 39-54, (Jun. 10, 2000).

Kontkanen et al., "On Supervised Selection of Bayesian Networks," Proceedings of the 15th International Conference on Uncertainty in Artificial Intelligence, Morgan Kaufmann Publishers, pp. 334-342, (Jun. 10, 1999).

Rissanen, "Hypothesis Selection and Testing by the MDL Principle," The Computer Journal, vol. 42 (No. 4), pp. 260-269, (Jun. 10, 1999).

Wallace et al., "Minimum Message Length and Kolmogorov Complexity," The Computer Journal, vol. 42 (No. 4), pp. 269-283, (Jun. 10, 1999).

* cited by examiner

LOCATION ESTIMATION IN WIRELESS TELECOMMUNICATION NETWORKS

This application is a Continuation of International Application PCT/FI01/01151 filed Dec. 27, 2001, which designated the U.S. and was published under PCT Article 21 (2) in English.

BACKGROUND OF THE INVENTION

The invention relates to methods and equipment for estimating a receiver's location in a wireless telecommunication environment, ie one or more networks which may be radio, microwave or optical networks. The one or more networks communicate at a plurality of channels simultaneously. Such a location estimation can be used to provide a wide variety of location-dependent services.

U.S. Pat. No. 6,112,095 to Mati Wax et al. discloses a method for providing a set of likely locations of a transmitter in a cellular network, such as AMPS or CDMA. A problem with the technique disclosed in the Wax patent is that it requires additional hardware at the network side, such as an antenna array which is equipped to measure an angular direction relative to a base station. In other words, to determine a mobile station's location, information on the network infrastructure must be available and the mobile station must transmit something to have its location estimated.

DISCLOSURE OF THE INVENTION

An object of the invention is to solve the above problems. In other words, the mechanism according to the invention should be able to estimate a receiver's location in a wireless telecommunication network even without prior knowledge of the network infrastructure (such as the locations of the base stations).

This object is achieved with a method and equipment which are characterized by what is disclosed in the attached independent claims. Preferred embodiments of the invention are disclosed in the attached dependent claims.

The invention is based on the surprising idea that it is possible to estimate a receiver's location with reasonable confidence without knowledge of the infrastructure of the receiver's wireless environment, ie the network(s) received by the receiver. For example, the technique disclosed in the above referenced Wax patent relies on the cellular network's base station configuration, including the location of the base stations. It is indeed surprising that the technique according to the invention is feasible. The fact that it is surprising is apparent as soon as one walks around with a mobile phone having a field strength indicator. In some places, a shift of 20 to 30 cm changes the field strength dramatically. Evidently, there must be a vast number of locations with near-identical field strength. One would expect that calibrating a location estimation system requires field strength (or other signal parameter) measurements at locations very close to each other, and that huge databases would be required to store these measurements. Atmospheric conditions, cityscapes and network configurations change continuously. At first sight, it would seem that the databases will deteriorate rapidly, unless constantly updated. However, computer simulations show that a technique based on measurements at several channels (frequencies) is surprisingly robust. Also, calibration data can be collected automatically at various conditions.

One aspect of the invention is a method for estimating a location of a receiver in a wireless telecommunication environment, the telecommunication environment comprising a plurality of channels for simultaneous communication, each channel having at least one signal parameter that varies with location differently from the other channels. The method can be implemented by the following steps:

1) for each of a plurality of calibration points in the wireless telecommunication environment, determining a set of calibration data, each set of calibration data comprising the location of the respective calibration point and at least one measured signal parameter for each of several channels at that calibration point;

2) on the basis of the sets of calibration data, maintaining a statistical model of the signal parameters of the several channels versus a receiver's location in the wireless telecommunication network;

3) measuring at least one signal parameter for each of several channels at the receiver; and 4) estimating the location of the receiver on the basis of the statistical model and the measured signal parameters of the several channels at the receiver.

Another aspect of the invention is an arrangement for carrying out the above method. The arrangement can be embodied as a receiver comprising means for determining sets of observed signal parameters, each set comprising at least one observed signal parameter for each of several channels at the location of the receiver. The receiver may itself comprise a location calculation module for determining a location estimate approximating the location of the receiver on the basis of said sets and a statistical model of the signal parameters of the several channels versus a receiver's location in a wireless telecommunication environment. Alternatively, the receiver may convey the sets to an external location calculation module.

The term 'receiver' means that the device whose location is being estimated does not have to transmit when its location is being estimated. In other words, it suffices that the device is making observations of its wireless environment. For example, a GSM phone does not have to receive a traffic channel. Rather it makes observations at all available frequencies. The device may also have, and typically has, transmitting ability, but it is not necessary for all embodiments of the invention, and the invention can be used to estimate the location of a pager or a broadcast receiver. Because transmission capability is not essential to location estimation according to the invention, the receiver may exploit signal parameters of networks it is not attached to. For example, a GSM phone attached to one GSM network may exploit signal strength values of other GSM networks.

The term 'environment' means that the receiver can receive (make observations on at least one network, but it can receive more than one. For example, a GSM phone may observe several operators' GSM networks. A more advanced receiver may observe many types of networks, such as cellular networks and broadcast networks.

A 'wireless' environment means that the one or more networks may be radio, microwave or optical networks. Also, the set of networks received by the receiver must communicate at a plurality of channels simultaneously, and the plurality of channels must comprise a subset of channels such that each channel in the subset has at least one signal parameter that varies with location differently from the other channels in the subset. This means that several channels having signal parameters with near-identical dependence from location, such as channels from a common transmitting antenna, do not normally give sufficient information for reliable location estimation. Normally, signals from at least three transmitting stations are required. Examples of suitable networks are cellular networks (such as GSM, GPRS, UMTS, etc.), broadcast networks (analogue audio, DAB or DVB), wireless local-area networks (WLAN) or short-range microwave networks, such as Bluetooth.

A 'location' may have one to three dimensions. A one-dimensional presentation of location may be sufficient in trains and the like. Two- or three-dimensional presentations of location are much more useful, however. In a two-dimensional presentation, the receiver is assumed to be substantially at earth level. Actually the height does not matter as long as the calibration data is measured at the same height (such as ground level, 13th floor, etc.) as the actual observations. Additionally, the calibration data may comprise a presentation of time. This means that the wireless environment, ie its signal parameters, vary with time. In other words, the calibration data comprises, in addition to the signal parameters, one to three location coordinates and, optionally, a presentation of time.

The term 'calibration data', as used herein, comprises calibration measurements (ie, measured signal values) and the location (and, optionally, time) at which the measurements were made.

The term 'statistical model' means that the individual sets of calibration data are not needed to calculate an individual receiver's location. The difference between a statistical model and the sets of calibration data can be illustrated by the following example. Assume that we have a number of $\{x, y\}$ pairs such that there is some dependence between x and y. The y value at a location x can be calculated on the basis of all the $\{x, y\}$ pairs. A much faster way to predict the value of y given a value of x is to calculate a mathematical function $y=f(x)$. In this example, the function f is the statistical model. In other words, the value of y given a value of x is calculated without reference to the individual $\{x, y\}$ pairs. Location estimation on the basis of the statistical model is faster and requires less storage space than location estimation on the basis of the individual sets of calibration data.

The statistical model can have a large variety of different implementations, such as probabilistic models, neural networks, fuzzy-logic systems, kernel estimators, 'support vector machines, decision trees, regression trees, Kalman filters and other statistical filtering methods, wavelets, splines, inductive logic programming methods, finite mixture models, hidden Markov models, etc. As used in this context, the term 'statistical model' may also refer to a mixture of several statistical (sub)models.

The term 'channel' should have a wide interpretation, meaning more or less the same as a frequency or frequency band. The receiver does not have to communicate on the channel, as long as the receiver (or an attached measuring apparatus) can measure at least one signal parameter of that channel. In TDMA systems, each frequency has several timeslots, each of which carries one channel. As far as the invention is concerned, all timeslots having the same frequency give identical information, and any one of them can be used as a 'channel'. If the measured signal parameter is signal strength, the receiver does not even have to be able to interpret the contents of the channel.

An illustrative but non-exhaustive list of the signal parameters varying with location comprises signal strength, timing advance and error ratio. The list may also comprise the availability of certain channels, but this can be seen as a special case in which the signal strength and/or error ratio is quantified to a yes/no question. If directional antennas are used, the direction of the radio beam(s) can be used as well. Thus the measured signal parameters do not have to correspond to a certain channel, but they can be derived values. For example, a measured parameter set may be or comprise a vector $V=[V1, V2, V3 \ldots]$ in which $V1$, $V2$ etc. are the indices of the best, second best, etc. available channel. For the purposes of clarity, however, we will use examples in which the signal parameters are related to certain channels.

Each set of calibration data comprises the location of the respective calibration point and at least one measured signal parameter for each of several channels at that calibration point. Calibration points are points whose location and signal parameters are known or measured. The calibration measurements are typically determined by means of fixed and/or mobile calibration receivers. Fixed calibration receivers can be attached to buildings, traffic signs, lampposts and the like. Mobile calibration receivers can be transported with persons or in vehicles. The calibration receivers measure the signal parameters like the actual receivers do. The measured signal parameters can be transferred to the statistical model via wired or wireless transmission (=on-line) or by moving a detachable media, such as a memory disk, tape or card (=off-line).

Location estimation can take place at the receiver site or at the network site. If the location is estimated at the receiver site, the receiver (or an attached computer) must have access to the statistical model. With current technology, a feasible statistical model can be compressed to a size which is manageable in a laptop or palmtop computer. The model can be updated while the computer is connected to the Internet, for example. Alternatively, the model can be supplied on a detachable memory, such as a CD-ROM or DVD-ROM. In the future, even a mobile phone will have sufficient memory for holding the statistical model. The model can be updated by means of a data call via a fast connection, for example. If the receiver site stores a copy of the statistical model, it needs no transmission capability, and the actual receiver can be a broadcast receiver, a pager or a dedicated add-on card for a laptop computer, similar in appearance to current GSM attachment cards for laptops.

Alternatively, the receiver may be part of a transceiver, such as a mobile phone or a WLAN or Bluetooth interface attached to a portable or hand-held computer. In this case, the transceiver may send the measurement results to the network which forwards the results to a location server. Depending on the type of transceiver, the measurements can be sent in a short message, via a data call or a WAP or WLAN connection, for example. The location server can send the transceiver its location estimate over a similar connection.

According to a preferred embodiment of the invention, the signal parameter measurements (the calibration measurements and/or the receiver's current observations) are quantified to a relatively small number of classes, such as two to five classes. In other words, the granularity of the measurements is increased. At first sight, such granularity increase seems to lose information. For instance, assume that the signal strength of a certain channel at a certain location is 34 units on a scale of 0 to 100 (the actual unit is irrelevant). Instead of storing the result of 34 units, we only store the fact that the measurement was between 25 and 50, ie a value of 1 on a scale of 0 to 3. It would seem that a value of 34 on a scale of 0–100 can better predict the signal strength in the neighborhood of that location than a value of 1 on a scale of 0 to 3 does. However, in many cases increased granularity results in increased location accuracy. One reason for this is that on a high-resolution scale, there are many values that occur relatively seldom, whereas on a low-resolution scale, all possible values occur relatively frequently.

An advantage of the invention is that prior information on the network infrastructure is not necessary (although it may be useful). This means that a location service according to the invention is not tied to network operators. Even if the location service according to the invention is maintained by a network operator, that operator can exploit observations from other operators networks without prior information on their infrastructure. The invention is applicable in a wide variety of network techniques, such as cellular networks, broadcast networks or wireless local-area networks.

BRIEF DESCRIPTION OF THE DRAWINGS

The invention will be described in more detail by means of preferred embodiments with reference to the appended drawing wherein.

DETAILED DESCRIPTION OF THE INVENTION

Figure 1:
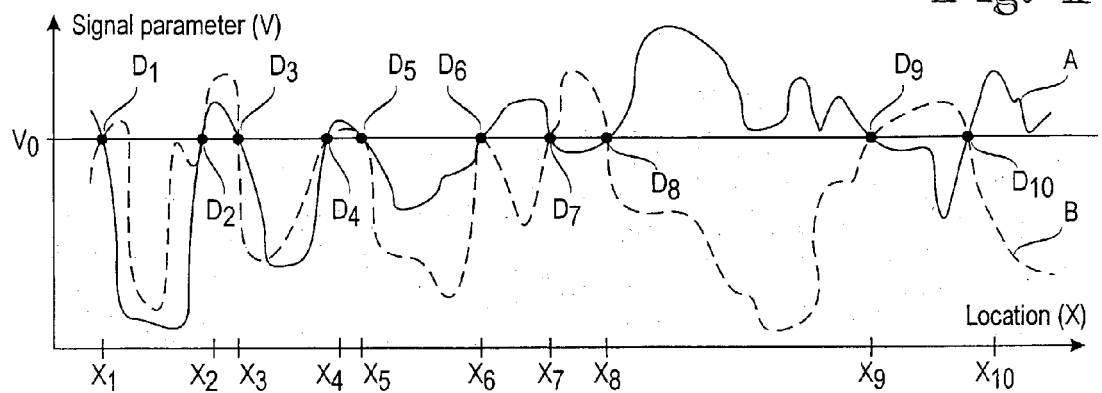
FIG. 1 illustrates various graphs of signal parameter versus receiver location.

FIG. 1 illustrates various graphs of signal parameter versus receiver location. The horizontal axis represents the (one-dimensional) location of a receiver. The vertical axis represents a signal parameter V (such as signal strength, or error ratio) measured by a receiver. Graphs A and B depict signal parameters of two channels. In this hypothetical example, we have 10 data points $D_1$ to $D_{10}$ measured at location $X_1$ to $X_{10}$, respectively. Both graphs A and B share the data points $D_1$ to $D_{10}$ having the respective locations $X_1$ to $X_{10}$ and the signal parameter value $V_0$. FIG. 1 gives a faint idea of the difficulties in implementing the invention. Not only is the parameter value $V_0$ common to 10 different locations (in this example), but the 10 locations could be explained equally well by both graphs A and B. The well-known Nyquist criterion states that a signal can be fully reconstructed if sampled at more than twice its highest frequency component. If the graphs A and B represent, say, field strength in a GSM network having a nominal frequency of 900 MHz, the spatial frequency of the graphs A and B has a wavelength of approximately 30 cm. Accordingly, the signal parameters should be sampled at points less than 15 cm apart, which is clearly an impossible task. But if the signal parameters are sampled at points more than half a wavelength apart, the graphs A and B cannot be reconstructed, as evidenced by the fact that between points $X_6$ and $X_{10}$ the graphs A and B have no similarity whatsoever.

The reason that the present invention works in practice stems from the fact that as the number of channels increases, the number of locations where the channels behave as described above decreases rapidly, and so it becomes increasingly unlikely that any two points cannot be distinguished from each other based on the measured parameters.

Figure 2:
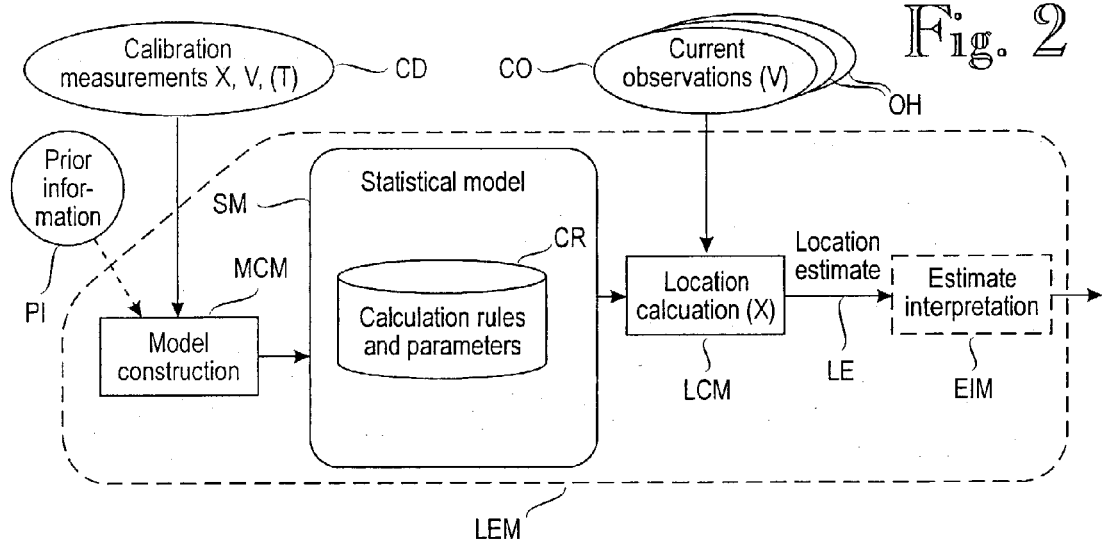
FIG. 2 is a block diagram illustrating the general concept of the invention.

FIG. 2 is a block diagram illustrating the general concept of the invention. In FIG. 2, the invention is implemented as a compact location estimation module LEM, although more distributed implementations are equally possible. An essential feature of the invention is a statistical model SM of the receiver's wireless environment, the model being able to predict the receiver's location given a plurality of current observations at the receiver site. The statistical model SM is built and maintained by a model construction module MCM, on the basis of calibration data CD and, optionally, on the basis of prior information PI of the wireless environment. The optional prior information PI may comprise information on network infrastructure, such as the locations and radio parameters of base stations. The locations at which calibration measurements are collected are called calibration points. The calibration data CD comprises data records each of which comprises the location X of the calibration point in question and the set of signal parameters V measured at that calibration point. Optionally, the calibration data records may also comprise the time at which the measurement was made, in case the signal parameters vary with time. The location X can be expressed in any absolute or relative coordinate system. In special cases, such as trains, highways, tunnels, waterways or the like, a single coordinate may be sufficient, but normally two or three coordinates will be used. The reference sign X denotes the set of all coordinates of the location.

It should be noted that the term 'training data' is often used in the context of such statistical models. In the context of this invention, the term 'calibration' is preferred, because 'training' may convey the idea that the model is ready after initial training, whereas 'calibration' better conveys the idea that the model may have to be updated regularly as the conditions change.

There is also a location calculation module LCM for producing a location estimate LE on the basis of the receiver's current observations CO and the statistical model SM. Technically, the 'measurements' and 'observations' can be performed similarly, but to avoid confusion, the term 'measurement' is generally used for the calibration measurements, and the signal parameters obtained at the current location of the receiver are called 'observations'. The receiver's most recent set of observations is called current observations. The location calculation module LCM or a separate estimate interpretation module EIM may also use the receiver's observation history OH to interpret the location estimate. In other words, the observation history OH can be used to resolve ambiguities in cases where a set of observations can be explained by two or more locations with substantially equal probability.

Figure 3:
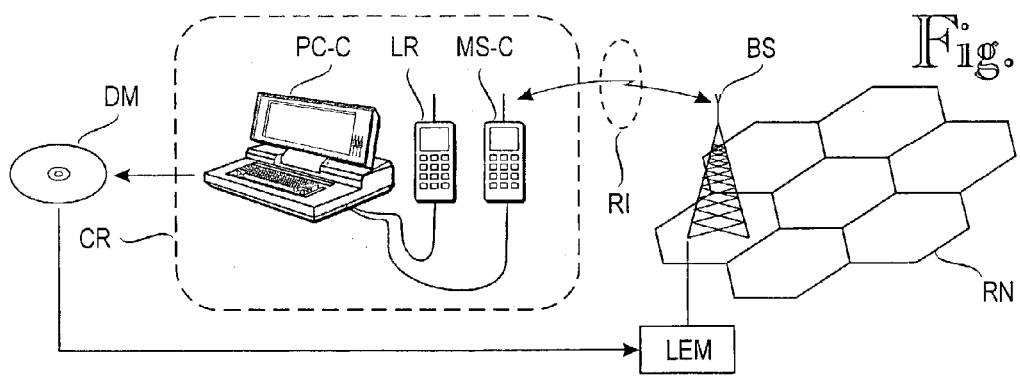
FIG. 3 is a block diagram illustrating a typical calibration receiver for determining calibration measurements.

FIG. 3 is a block diagram illustrating a typical calibration receiver CR for determining the calibration measurements in the calibration data CD shown in FIG. 2. FIG. 3 shows a mobile calibration receiver comprising a portable computer (or data processor) PC-C, a mobile station MS-C (such as a GSM, GPRS or UMTS mobile phone) and a location receiver, such as a GPS (global positioning system) device. The suffixes -C stand for calibration receiver, to distinguish the corresponding parts of the actual receiver R in FIG. 4. For clarity, the calibration receiver's main modules PC-C, MS-C and LR are shown separately, although the two latter modules are available as PC cards which can be inserted into a card socket in a typical laptop computer. The calibration receiver CR observes the radio signal parameters of the available base stations BS in a cellular radio network RN. The interface between the radio network RN and the mobile station MS-C is called a radio interface RI. If the radio interface RI is bidirectional, the calibration receiver CR may send its observations to the location estimation module LEM via the same radio interface RI. Alternatively, the calibration receiver's portable computer PC-C may store the observations on a detachable memory DM medium, such as a recordable CD-ROM disk, which is later brought off-line to the location estimation module LEM.

The location receiver LR of the calibration receiver CR can be entirely conventional, for example a commercial GPS (global positioning system) receiver, as long as it can output the measured coordinates to an attached computer or other data processor. The portable computer can also be a conventional, suitably programmed computer. Only the mobile station MS-C may need modifications to its hardware or firmware (its ROM contents). Modifications may be needed, depending on how many signal parameters the mobile station measures. For example, a conventional GSM phone monitors, in addition to its currently active cell, some parameters of its neighbouring cells, but the neighbouring cells are not measured as extensively as the active cell. Only when a GSM phone is having an active call, does it monitor the neighbouring cells as extensively as its active cell. For the purposes of the invention, it would be beneficial to modify the mobile station's cell monitoring routines such that it monitors the available cells as extensively as possible.

Naturally, the calibration receiver CR can comprise more than one mobile station for monitoring different types of networks or different operator's network. For monitoring broadcast networks, the calibration receiver CR should also comprise a scanning broadcast receiver (not shown separately). Alternatively, the mobile station MS can be a multimode device capable of receiving cellular networks and broadcast networks.

Calibration receivers, like the one shown in FIG. 3, can be carried along in vehicles or with persons. Fixed calibration receivers, which do not need a GPS receiver, can be attached to buildings, traffic signs, lampposts and the like. As an alternative to using a separate location receiver, the location of the calibration receiver can be determined by one or more of the following techniques: showing the receiver's location on a digitized map; entering a street (or other) address and converting it to a location by means of a suitable database; or using other known locations, such as stops of public vehicles.

Figure 4A:
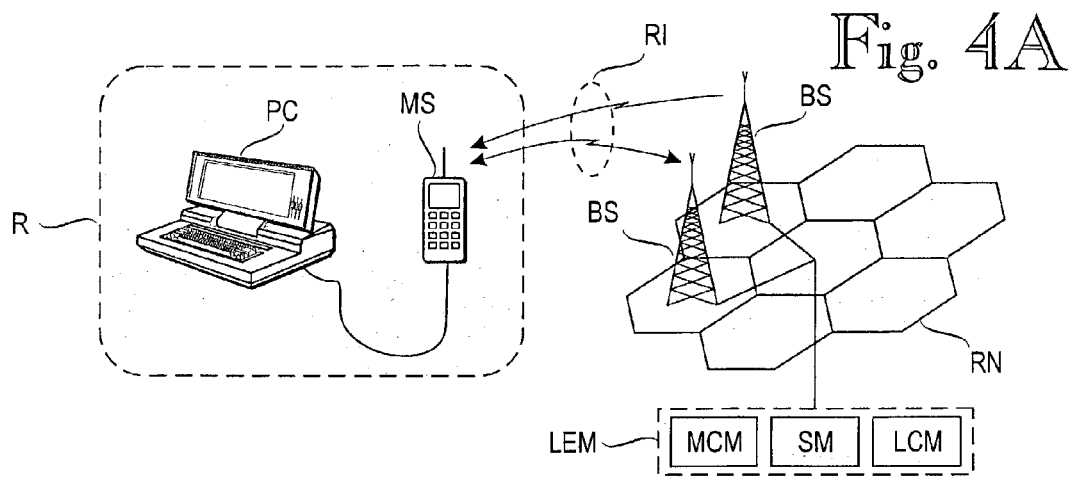
FIGS. 4A and 4B are block diagrams illustrating mobile receivers whose location is to be estimated.

FIG. 4A is a block diagram illustrating a typical mobile receiver whose location is to be estimated. A simple embodiment of a receiver R comprises only a suitably programmed mobile station MS. For some embodiments, the receiver R may also comprise a portable computer (or data processor) PC. Again, the term 'receiver' implies that the device is receiving when its location is being estimated although, in practice, most embodiments will also have transmitting capability. The embodiment shown in FIG. 4A does not contain the statistical model SM. Accordingly, the receiver R must send its current observation set CO to the location estimation module LEM via the base station BS it is connected to. The location estimation module LEM returns the receiver its location estimate LE via the radio interface RI.

Figure 4B:
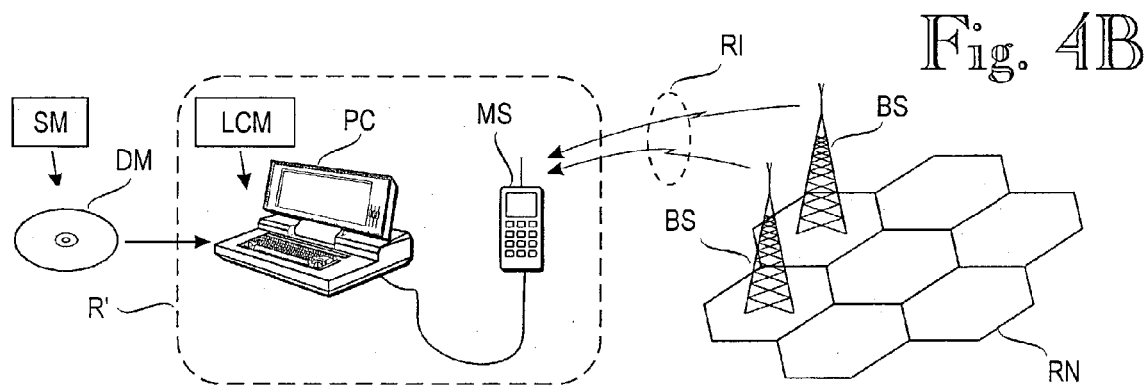

FIG. 4B shows an alternative embodiment in which the receiver's attached computer PC receives a copy of the statistical model SM on a detachable memory DM, such as a CD-ROM disk, and the receiver is able to determine its own location without transmitting anything. As a yet further alternative (not shown separately), the receiver's attached computer PC may receive the statistical model via an Internet (or any other data) connection to the location estimation module LEM. Future wideband mobile stations may be able to receive the statistical model via the radio interface RI. A hybrid of the technologies may also be used such that the receiver receives an initial statistical model via a wired connection or on the detachable memory, but later updates to the model are sent via the radio interface.

Note that in FIGS. 3, 4A and 4B, the radio network RN is shown as a cellular network and the mobile stations MS resemble cellular handsets. The invention is not limited to cellular networks, however, and can equally well be used in a WLAN environment, in which case the mobile stations are replaced by WLAN interface devices.

Statistical Modeling

Possible statistical models will now be studied in more detail. In general, a statistical model, as used in this context, can comprise several individual statistical submodels, in which case the actual estimate is obtained by combining the individual results of the submodels.

There are many possible statistical modeling approaches that can be used for producing the required statistical submodels. In the following we will focus on the probabilistic approach. A probabilistic model means that when estimating the location of the mobile terminal, the result is represented as a probability distribution over the possible locations if location X is modeled as a discrete variable, whereas, if the location X is modeled as a continuous variable, the result is represented as a density function. In the following, the focus will be on the discrete case. Similarly, the location-dependent measurements V can also be modeled either with discrete or continuous observational variables. The number of dimensions of vector V (the number of measurements that can be obtained) varies and depends on the properties of the operating wireless network(s).

Again, there are many probabilistic model classes that can be used. In the following preferred embodiment of the invention, the focus will be on parametric probabilistic models. In this case a single model can be represented as a pair $(M,\theta)$, where M denotes the model structure, ie the qualitative properties of the model that determine which parameters are required, and $\theta$ denotes the quantitative values of the parameters.

There are two principal approaches for constructing parametric probabilistic models $(M, \theta)$ in the present context, namely conditional models and joint models. Conditional models are models that directly give probability distributions of the form $P(X|V,M, \theta)$, where V denotes the values of the observational variables (for example, a vector consisting of signal strength measurements), and X denotes the location where observation V was made. Joint models define probability distributions $P(X,V|M, \theta)$ on events (X,V).

However, by using the axioms of probability theory we can see that $P(X|V,M, \theta) = P(X,V|M, \theta)/P(V|M, \theta)$, where $P(V|M, \theta)$ does not depend on the location X. Thus we can treat the denominator $P(V|M, \theta)$ as a normalizing constant. This means that we can always use a joint model for conditional modeling, and in the following we will focus on joint modeling and regard conditional modeling as a special case.

There are many ways to use parametric models in location estimation. Let us first assume that we have decided to use a single model structure M, and we wish to determine the parameters from the calibration data CD so that we get a joint probabilistic model for events (X,V), which also gives, as described above, the required conditional distribution for location X given the observations V. As described in [Kontkanen et al. 2000], there are several alternatives for producing the joint distribution:

1. We can use $P(X, V|M, \theta(D))$, where $\theta(D)$ is the maximum likelihood instantiation of the parameters, ie $\theta(D) = \arg\max P(D|M, \theta)$.

2. We can use $P(X, V|M, \theta(D))$, where $\theta(D)$ is the Bayesian maximum posterior instantiation of the parameters, ie $\theta(D) = \arg\max P(\theta|M, D)$.

3. We can use $P(X,V|M, \theta(D))$, where $\theta(D)$ is the mean of the posterior distribution $P(\theta|M, D)$.

4. We can integrate over the parameters $\theta$: $P(X, V|D,M) = \int P(X,V|D,M, \theta) P(\theta|D,M) d\theta$.

5. We can use $P(X, V|M, \theta(D))$, where $\theta(D)$ is the parameter instantiation optimizing the minimum message length criterion described in [Wallace and Dowe 1999] and the references therein.

In some special cases, alternatives 3 and 4 are equivalent.

In general, one may wish to use several model structures M. In the following, we will assume that we have fixed the general model family (set) F, the set of all the possible model structures under consideration. For example, the set F may correspond to the set of all possible Bayesian network models (see [Cowell et al. 1999], [Pearl 1988]). In this case we produce the predictive distribution $P(X|V,F)$ by computing a weighted sum over all the models in F: $P(X|V,F) \propto \Sigma P(X, V|M) W(M)$. Possible weighting functions W include the following:

1. The posterior of the model structure M, given the data: $P(M|D) \propto P(D|M)P(M) = P(M) \int P(D|\theta,M) P(\theta|M) d\theta$.

2. The stochastic complexity of the data, given the model structure M, and the approximations of the stochastic complexity criterion, discussed in [Rissanen 1999] and the references therein.

3. The minimum message length of the data, given the model structure M, and the approximations of the MML criterion, discussed in [Wallace and Dowe 1999] and the references therein.

It is also possible to use conditional (supervised) versions of the weighting functions, in which case the weights are computed with respect to conditional modeling, and the actual data is taken to consist of only the values of the location variable X, and the measurement data V is treated as "background data". These alternatives are discussed in [Kontkanen et al 1999].

If the number of model structures M in F is too high for computing the weighted sum in a feasible time, we have to restrict the model family F by performing a search in F, and pruning F to consist of only those model structures that are the best with respect to some cost function. The possible cost functions for performing the search include the weight functions listed above. Any search algorithm can be exploited in this task. An extreme case of this type of restricting search is a case where only one single model structure M in F is chosen. In other words, the sum over model structures reduces to a single term corresponding to the use of a single model with the largest weight.

If the observations V are modeled as discrete variables, the granularity of the discrete variables can be viewed as part of the model structure M. The granularity can either be fixed by the user (representing prior information), or as part of the model structure M, it can be learned from the calibration data.

The optional prior information, such as information on the locations and radio parameters of the base stations, represents knowledge other than that extracted from the calibration measurements. In the probabilistic setting, we can identify the following ways for coding the prior information:

1. By choosing the initial model family F of probability models (determining the model structures considered, and with each model structure, the forms of the distributions used and the assumptions made).

2. If the observational variables V are taken to be discrete, by choosing the granularity of the discretization.

3. If the location variable X is taken to be discrete, by choosing the granularity of the discretization.

4. By determining the prior distribution $P(\theta|M)$ for the parameters of the model M.

5. By determining the prior distribution $P(M)$ for the model structures M in the family F.

Missing Data

There are several alternative procedures for handling missing data:

1. Treat 'missing' as an extra value for the variable in question.

2. Ignore the missing entries (the sufficient statistics are computed from the existing data only)

3. Estimate the missing values from the existing data and/or prior information. The estimates can either be used for filling in educated guesses of the missing values, or they can be treated as partial observations (sufficient statistics of several possible values can be simultaneously partially updated, according to, e.g., their estimated probabilities).

4. Fill in the missing values by using random guesses.

Location Interpretation and Reporting

The result of the probabilistic location estimation can be reported in several different ways. First, we can divide the working area into several subareas in different ways: the subareas can either form a full partitioning of the work area, or they can cover only a portion of the whole work area. An example of the latter case is that only the locations listed in the calibration data D (with a desired accuracy) are considered. The result of the probabilistic location estimation can now be reported either 1. By giving the full probability distribution over the areas, ie, for each area X, give the corresponding probability $P(X|V,F)$.

2. By giving the most probable subarea X with respect to the distribution $P(X|V,F)$.

3. By giving a point estimate minimizing the expected value of some error function with respect to the distribution $P(X|V,F)$.

An example of alternative 3 is the mean squared error, in which case the point estimate is the weighted average of the centre points of the subareas (assuming that the subareas are of equal size), the weights being the probabilities $P(X|V,F)$. If the subareas X are not of equal size, the weights can be rescaled with respect to the relative size of the corresponding subarea, for example by multiplication.

Uncertainty about the receiver's location can be reduced by prior information PI, if available, and/or the observation history OH. Let us assume that the above alternative 1 was chosen initially. In other words, the user or application requesting the location of the receiver is reported the full probability distribution. The probability distribution may indicate a number of feasible locations. The prior information PI, if available, may indicate that only one of the locations is possible, given the received cell identifiers or the like. Alternatively, the observation history OH can be used to exclude some locations. For example, although a number of locations could explain the receiver's current location, only a subset of the locations can explain the entire observation history OH, given the receiver's finite speed.

PERFORMANCE EXAMPLES

Example 1

Location Estimation with a Naïve Bayes Model

The subareas X under consideration are the locations where the calibration data was collected. The radius of the locations is assumed to be one meter, although any unit can be used. The observational variables V are taken to be discrete with m values. The value of m can be a constant (eg 3), or it can be optimized by using one of the weighting functions described above. The boundary points between the intervals can be determined so that the number of training samples within each interval is the same (equal-frequency discretization), or alternatively, the intervals can be made of equal width (equal-width discretization). The intervals can also be determined by using a clustering algorithm, such as the K-means algorithm.

One model structure M is used: the observational variables $V_1, \ldots, V_n$ are assumed to be independent, given the value of the location variable X. The data is assumed to be independently and identically distributed (="i.i.d."), and follow the Multinomial distribution with the assumptions described in [Geiger and Heckerman, 1998]. Prior information is non-existent. A non-informative uniform prior distribution for the model parameters is used. Alternatives are discussed in [Kontkanen et al, 2000]. The distribution P(X, V|D,M) is computed by integrating over the parameters. With the above assumptions, this can be done as described in [Kontkanen et al., 2000].

In this experiment, the observation history OH is taken into account by treating the eight (other numbers are equally possible) last signal measurements as a single measurement vector V so that the eight individual measurements are assumed to be independent of each other. The result is given as a point computed as a weighted average of the centre points of the subareas, where the weight for area X is P(X|V,D,M).

This method was implemented and tested empirically in downtown Helsinki by exploiting the signal strengths of Sonera GSM network. The work area was approximately 400×500 meters in size, and the calibration data was collected outside in the streets in approximately 50 evenly distributed points. The average distance between two measurement locations was approximately 50 meters. The system was tested by using the location estimator in 300 randomly situated locations within the work area. The average location error in this test was 42 meters.

Example 2

Location Estimation with a Mixture of Histograms Model

The location variable X is taken to consist of two coordinates (one or three coordinates are also possible) on a fine-grained, discrete scale. The resolution of the scale can be, for instance, one meter. The observational variables $V_1, \ldots, V_n$ are taken to be discrete with the maximum resolution determined by the measuring device, e.g. 1 dBm. We denote the combination of $V_1, \ldots, V_n$ by V. Missing values are replaced by a value which is smaller than any possible observable value. Several models are considered. Each model $M_{kl}$ is associated with parameters k, l, and $\theta_{kl}$ whose semantics is described below.

Figure 5:
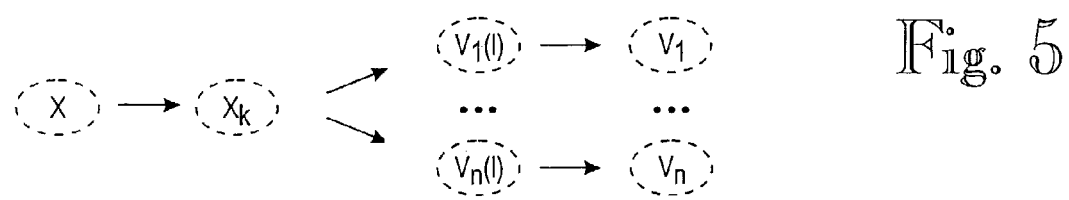
FIG. 5 illustrates the structure of a statistical model.

FIG. 5 illustrates the structure of model $M_{kl}$. The value of variable $X_k$ is obtained from the value of variable X via discretization into k values. The conditional distribution of variables $V_1(I), \ldots, V_n(I)$ given the value of $X_k$ is described by model parameters $\theta_{kl}$. Each $V_i$, where i belongs to the set $\{1, \ldots, n\}$, is uniformly distributed within the interval defined by the value of variable $V_i(I)$. A low-resolution location variable $X_k$ is derived from the fine-grained location variable X by discretizing the latter with equal width discretization (other discretization methods also possible) using k bins, ie k possible values. Whenever a boundary point of the low-resolution discretization appears between two boundary points of the fine-grained discretization, the mass (i.e. the number of observations within the sub-interval) is divided according to the relative size of the overlapping intervals. For instance, let the fine-grained discretization have 5 bins (4 boundary points) within the range [0, 10]. Let the low-resolution discretization have 2 bins, and therefore one boundary point at the value 5. If there are n observations within the range [4, 6], i.e. within the third bin of the fine-grained discretization, then both low-resolution bins get n/2 observations, because the boundary point 5 splits the range [4, 6] into two parts of equal size. Likewise, each observational variable $V_i$ is discretized using I possible values, thus obtaining a low-resolution variable $V_i(I)$.

Model $M_{kl}$ describes the conditional probability functions $P(V(I) | X_k, M_{kl}, \theta_{kl})$, where $\theta_{kl}$ denotes the model parameters of model $M_{kl}$. The low-resolution observational variables $V_1(I), \ldots, V_n(I)$ are taken to be independent, given the value of the location variable $X_k$. For each i belonging to the set $\{1, \ldots, n\}$, the distribution $P(V_i(I) | X_k, M_{kl}, \theta_{kl})$ is taken to be i.i.d., and follow the Multinomial-Dirichlet distribution with the assumptions described in [Geiger and Heckerman, 1998]. Prior information is nonexistent. A uniform prior distribution over models $M_{kl}$ is used. A non-informative equivalent sample size (ESS) prior distribution for the model parameters is used as described in [Heckerman, 1995]. A second-order prior for the ESS parameter is used, e.g., a uniform distribution over the set $\{1, 10\}$. For each i belonging to the set $\{1, \ldots, n\}$, the distribution $P(V_i(I) | X_k, M_{kl})$ is computed by integrating over the model parameters. With the above assumptions, this can be done as described in [Kontkanen et al., 2000].

The distribution $P(V_i | V_i(I))$ is taken to be uniform over the interval defined by the value of $V_i(I)$ and the discretization of $V_i$ defined by parameter I. For instance, let the range of $V_i$ be [0, 10], let the value of I be 5, and let the value of $V_i(I)$ be 2. Assuming that equal width discretization is used, the values of $V_i$ are discretized into five intervals, [0, 2], [2, 4], [4, 6], [6, 8], and [8, 10]. Now, given that the value of $V_i(I)$ is 2, the distribution $P(V_i | V_i(I))$ is uniform over the interval [2, 4]. The variables $V_1, \ldots, V_n$ are taken to be independent of each other given the values of variables $V_1(I), \ldots, V_n(I)$.

Combining the two distributions $P(V(I) | X_k, M_{kl})$ and $P(V | V(I))$, we obtain a conditional distribution $P(V | X_k, M_{kl})$. The distribution P(V|X, D) is computed as a weighted average over the models $M_{kl}$, where k and l vary over the set $\{1, \ldots, 20\}$ (other choices equally possible). The models are weighted by the marginal likelihood $P(V(D) | X_k(D), M_{kl})$, where the calibration data (with n observations) consists of the vectors $V(D)=(V^1(D), \ldots, V^n(D))$ and $X_k(D)=(X_k^1(D), \ldots, X_k^n(D))$.

With these assumptions, the marginal likelihood can be computed efficiently in two parts; First, the product of the terms with the form $P(V(I) | X_k, M_{kl})$ can be computed as described in [Heckerman, 1995] and [Geiger and Heckerman, 1998]. Second, the terms with the form $P(V|V(I))$ have the same value, which is a constant depending on I, because the distribution P(V|V(I)) is uniform. The result is given as a posterior probability distribution P(X|V, D)=P(V|X, D) P(X|D)/P(V|D) over the location variable X. The distribution P(X|D) is taken to be uniform. The term P(V|D) is a normalizing factor whose value is ignored. Instead the resulting distribution P(X|V, D) is normalized so that it sums up to one.

The method described above was implemented and tested empirically in Helsinki on the second floor of the building at address Teollisuuskatu 23 by using a laptop computer measuring the WLAN signal strengths through a WLAN PC card. The work area was approximately 20×45 meters (900 square meters) in size. Calibration data was collected in 12 arbitrary places, and the total number of data vectors in it was 204. The system was tested by using the location estimator in 25 randomly chosen locations within the work area. Location estimation was repeated five times in each location. When the above system was used for determining the location area with 95% of the probability mass, the correct place was in this area 77% of the time. The average size of the 95% probability mass area was approximately 151 square meters, i.e. about 17% of the total area.

REFERENCES

Cowell, R., Dawid P. A., Lauritzen S., Spiegelhalter D: *Probabilistic Networks and Expert Systems*, Springer, N.Y., 1999.

Geiger, D. and Heckerman, D: *Parameter Priors for Directed Asyclic Graphical Models and Characterization of Several Probability Distributions*, Techical Report MSR-TR-98-67, Microsoft Research, December 1998.

Heckerman D., *A Tutorial on Learning with Bayesian Networks*, Technical Report MSR-TR-95-06, Microsoft Research, 1995.

Kontkanen, P., Myllymäki, P., Silander, T., Tirri, H., and Grünwald, P: *On Predictive Distributions and Bayesian Networks*, Statistics and Computing 10 (2000), p. 39–54.

Kontkanen, P., Myllymäki, P., Silander, T. and Tirri, H: *On Supervised Selection of Bayesian Networks*, Proceedings of the 15th International Conference on Uncertainty in Artificial Intelligence (UAI'99), Laskey, K. and Prade, H., 1999, Morgan Kauffmann, p. 334–342.

Pearl, J: *Probabilistic Reasoning in Intelligent Systems: Networks of Plausible Inference*, Morgan Kaufmann Publishers, San Mateo, Calif., 1988.

Rissanen, J: *Hypothesis Selection and Testing by the MDL Principle*, Computer Journal 42 (1999) 4, p. 260–269.

Wallace, C. S. and Dowe, D.L., *Minimum Message Length and Kolmogorov Complexity*, Computer Journal 42 (1999) 4, p. 270–283.

All references are incorporated herein by reference.

The invention claimed is:

1. A method for estimating a location (X) of a receiver (R, R') in a wireless telecommunication environment (RN), the telecommunication environment comprising a plurality of channels for simultaneous communication, each channel having at least one signal parameter (V) that varies with location (X) differently from the other channels;
   wherein the method comprises the steps of:
   for each of a plurality of calibration points in the wireless telecommunication environment, determining a set of calibration data (CD), each set of calibration data comprising the location (X) of the respective calibration point and at least one measured signal parameter (V) for each of several channels at that calibration point;
   on the basis of the sets of calibration data (CD), maintaining a statistical model (SM) of the signal parameters (V) of the several channels versus a receiver's location in the wireless telecommunication environment (RN);
   determining a set of observed signal parameters (CO), the set comprising at least one observed signal parameter (V) for each of several channels at the location (X) of the receiver (R, R'); and
   determining a location estimate (LE) approximating the location (X) of the receiver (R, R') on the basis of the statistical model (SM) and the set of observed signal parameters (CO).

2. A method according to claim 1, further comprising the receiver (R) sending the set of observed signal parameters (CO) to an external location estimation module (LEM) which sends the location estimate (LE) to the receiver.

3. A method according to claim 1, further comprising the receiver (R') storing a copy of the statistical model (SM) and determining the location estimate (LE) on the basis of the copy of the statistical model (SM).

4. A method according to claim 1, further comprising maintaining the statistical model (SM) also based on prior information (PI) about the wireless environment's (RN) infrastructure.

5. A method according to any claim 1, wherein the statistical model (SM) is or comprises a probabilistic model.

6. A method according to claim 5, wherein the statistical model (SM) is or comprises a Bayesian network model.

7. A method according to claim 1, wherein the signal parameters (V) in the statistical model (SM) are independent of each other, given the location (X).

8. A method according to claim 1, further comprising reducing uncertainty concerning the receiver's location based on a history (OH) of the observed signal parameters.

9. A method according to claim 1, further comprising modeling at least some of the signal parameters (V) by discrete variables whose values correspond to intervals or unions of intervals on the range of possible signal parameter values.

10. A method according to claim 1, further comprising modeling the location (X) as a discrete variable.

11. A location estimating apparatus (LEM) for estimating a location (X) of a receiver (R, R') in a wireless telecommunication environment (RN), the telecommunication environment comprising a plurality of channels for simultaneous communication, each channel having at least one signal parameter (V) that varies with location (X) differently from the other channels;
   the location estimating apparatus comprising a model construction module (MCM) for:
   receiving a set of calibration data (CD) for each of a plurality of calibration points in the wireless telecommunication environment, each set of calibration data comprising the location (X) of the respective calibration point and at least one measured signal parameter (V) for each of several channels at that calibration point; and
   maintaining, on the basis of the sets of calibration data (CD), a statistical model (SM) of the signal parameters (V) of the several channels versus a receiver's location in the wireless telecommunication environment (RN); and a location calculation module (LCM) for:
   receiving a set of observed signal parameters (CO), the set comprising at least one observed signal parameter (V) for each of several channels at the location (X) of the receiver (R, R'); and
   determining a location estimate (LE) approximating the location (X) of the receiver (R, R') on the basis of the statistical model (SM) and the set of observed signal parameters (CO).

12. A receiver (R, R') comprising:

means for determining sets of observed signal parameters (CO), each set comprising at least one observed signal parameter (V) for each of several channels at the location (X) of the receiver (R), and means for conveying the sets of observed signal parameters (CO) to a location calculation module (LCM) for determining a location estimate (LE) approximating the location (X) of the receiver (R) on the basis of said sets and a statistical model (SM) of the signal parameters (V) of the several channels versus a receiver's location in a wireless telecommunication environment (RN).

13. A receiver (R') according to claim 12, further comprising the location calculation module (LCM).

14. A receiver (R) according to claim 12, wherein the means for conveying the sets of observed signal parameters comprises means (RI) for conveying the sets to an external location calculation module (LCM).

15. A receiver according to claim 12, wherein at least some of the sets of observed signal parameters (CO) relate to networks the receiver is not attached to.

\* \* \* \* \*

UNITED STATES PATENT AND TRADEMARK OFFICE
CERTIFICATE OF CORRECTION

PATENT NO. : 7,228,136 B2  
APPLICATION NO. : 10/465785  
DATED : June 5, 2007  
INVENTOR(S) : Petri Myllymäki Page 1 of 1

It is certified that error appears in the above-identified patent and that said Letters Patent is hereby corrected as shown below:

On the Title Page, Item (73) Assignee should read as follows:

Item (73) Assignee:   Ekahau Oy, Helsinki (FI)

Ekahau Inc., Saratoga, California

Signed and Sealed this

Eighth Day of December, 2009

David J. Kappos
*Director of the United States Patent and Trademark Office*